United States Patent [19]
Kornelson et al.

[11] Patent Number: 6,129,106
[45] Date of Patent: *Oct. 10, 2000

[54] PROPORTIONING VALVE AND CONTROL MEANS THEREFOR

[75] Inventors: Brent Kornelson; Wallace McCullouch, both of Kamloops, Canada

[73] Assignee: Fire-Trol Holdings, L.L.C., Phoenix, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 09/029,793

[22] PCT Filed: Jul. 16, 1996

[86] PCT No.: PCT/US96/11744

§ 371 Date: May 27, 1998

§ 102(e) Date: May 27, 1998

[87] PCT Pub. No.: WO98/02791

PCT Pub. Date: Jan. 22, 1998

[51] Int. Cl.[7] .................................................. G05D 11/13
[52] U.S. Cl. .................. 137/91; 137/101.19; 137/625.41
[58] Field of Search ................................. 137/91, 101.19, 137/625.41

[56] References Cited

U.S. PATENT DOCUMENTS

| | | | |
|---|---|---|---|
| 1,856,380 | 5/1932 | Foster | 137/597 |
| 2,225,210 | 12/1940 | Dillon | 137/625.41 X |
| 2,713,788 | 7/1955 | Goff | 137/94 X |
| 2,977,987 | 4/1961 | Maynard | 137/625.41 X |
| 4,522,231 | 6/1985 | Bergmann | 137/625.41 X |

*Primary Examiner*—Stephen M. Hepperle
*Attorney, Agent, or Firm*—Drummond & Duckworth

[57] ABSTRACT

The proportioning valve apparatus includes a cylindrical valve body having a first inlet for receipt of a first fluid, a second inlet for receipt of a second fluid, a mixing chamber and an outlet for releasing a mixture of the two respective inputs. A rotary barrier element is positioned adjacent to the first and second inlets and operates to selectively impede the flow of fluids through first and second inlets and into the valve chamber. Rotation of the rotary valve barrier in a first direction is operative to close the first inlet while simultaneously opening the second inlet. The present invention further includes a closed loop control system utilizing measurement of the density of the output mixture to control the activation of the proportioning valve.

1 Claim, 1 Drawing Sheet

PROPORTIONING VALVE AND CONTROL MEANS THEREFOR

BACKGROUND OF THE INVENTION

The present invention relates to proportioning valve apparatus for mixing first and second gas or fluid inputs to produce a mixed output. Additionally, the present invention relates to control systems for controlling a proportioning valve.

Mixing different liquids or gases to achieve a desired proportion is a time consuming and tedious task. Often this endeavor is undertaken by physically measuring a first gas or liquid and then adding that first liquid or gas to a measured amount of a second gas or liquid. Measurements may be conducted by means of volume or weight. The combined material must then be mixed to achieve a desired consistency. Unfortunately, this is a time-consuming process requiring a plurality of mixing containers and considerable manpower. For example, in the field of liquid compositions utilized to combat forest fires, the compositions often comprise a concentrate and a dilution of water which must be mixed at various proportional rates from 4.5:1 to 10:1 parts per water per part of concentrate. Various apparatus and methods have been employed in an effort to accurately and efficiently produce these fire fighting compositions including the manual measuring and mixing methods described above.

Unfortunately, present proportional valves and the control means for controlling these proportional valves are unsuitable for accurate and efficient production of an effluent mixture. For example, U.S. Pat. No. 4,561,629 discloses a solenoid valve for mixing gases to produce a desired output. Unfortunately, the output is produced by continuously cycling the solenoid valve at up to 20 Hz. Further, this valve is particularly inefficient as the first and second inlets are incapable of both being unobstructed at any one moment.

An additional solenoid valve is disclosed in U.S. Pat. No. 4,428,558. This reference discloses a valve apparatus including a single inlet conduit which directs a gas into a mixing chamber. The gas is then diverted to first and second outlets. Unfortunately, the device is not disclosed as being suitable for both gas and liquid flow. Furthermore, the valve is only configured with a single inlet to separate a single input flow into divergent conduits. In contrast, a proportioning valve is needed for mixing a plurality of gases or fluids to produce a single output mixture.

A control system for controlling the mixing of a first fluid at a first temperature with a second fluid at a second temperature is disclosed in U.S. Pat. No. 3,721,386. The control system includes measuring the temperature of the output fluid to control operation of a valve to proportion the mixture of the first fluid to the second fluid. Unfortunately, the control system is unsuitable for mixing gases or liquids where the inputs are at the same or substantially similar temperatures.

It would be advantageous to have a proportioning valve that accurately and precisely mixes first and second fluid or gaseous inputs into desired proportions to produce a desired fluid or gaseous mixture. Further, it would be advantageous to have a control system for controlling a proportioning valve to accurately and precisely mix first and second fluid or gaseous inputs to produce a desired fluid or gaseous mixture.

SUMMARY

Briefly, and in general terms, the present invention addresses the aforementioned disadvantages by providing a proportioning valve apparatus which accurately and precisely mixes selected first and second fluid or gaseous inputs in desired proportions to produce a desired fluid or gaseous output.

In a preferred embodiment, the proportioning valve apparatus includes a cylindrical valve body having a first inlet for receipt of a first fluid or gas, a second inlet for receipt of a second fluid or gas and an outlet for releasing a mixture of the two respective inputs. Formed in the center of the cylindrical valve body is a mixing chamber in fluid communication with the first inlet, second inlet and outlet for combining and mixing gases or fluids received from the first and second inlets. The proportioning valve further includes a rotary shaft which telescopes through a bore concentrically located in the valve body.

Disposed in the mixing chamber is a rotary plug coupled to the rotary shaft. The rotary plug includes a support arm affixed to the rotary shaft and an upstanding rotary barrier element. The support arm extends from the centrally located rotary shaft across the interior of the valve chamber to engage and support the upstanding rotary barrier element. The rotary barrier element is positioned adjacent to the first and second inlets, such that during operation of the proportioning valve, the rotary barrier element selectively obstructs the first and second inlets to, accordingly, selectively impede the flow of fluids or gases through first and second inlets and into the valve chamber.

The proportioning valve of the present invention further includes a valve control means affixed to the exterior of the cylindrical valve body for controlling the rotation of the rotary plug. Typically, the valve control means is a servo motor, stepper motor, solenoid motor or the like which engages the rotary shaft telescoping through the cylindrical valve body. The valve control means selectively controls rotation of the rotary shaft and accordingly, position of the rotary barrier to selectively obstruct the first and second inlets. The rotary valve barrier and the first and second inlets are sized and configured such that rotation of the rotary valve barrier in a first direction is operative to close the first inlet while simultaneously opening the second inlet. Similarly, rotation of the rotary valve barrier in the opposite direction is operative to open the first inlet while simultaneously closing the second inlet.

In operation, the first and second inlets are connected to first and second reservoirs, respectively, by tubular conduits. Gaseous or liquidous materials contained in the first and second reservoirs are allowed to flow by pressure, gravity or the like through the repetive conduits and through the first and second inlets to combine and mix in the valve chamber of the proportioning valve. Actuation of the valve control means effects rotation of the rotary barrier to selectively obstruct the first and second inlets to control the proportions of the first and second fluids to produce a desired output mixture.

It has also been found that where the densities of the first and second gases or liquids are different or where the mixing of the first and second gases or liquid produces a different density emitted from the output, such as by a chemical reaction between gases and fluids, the measured density of the output mixture provides an accurate and precise determinant for controlling the proportioning valve. Accordingly, a preferred embodiment of the present invention includes a closed loop control system which measures the density of the output mixture to provide accurate and precise proportioning of the mixing of the first and second gases or fluids. To this end, the closed loop control system of the present invention includes a density measuring means which measures the density of the output flow and produces signals representative of the density of the output flow. These signals are then sent, in turn, to a processing means such as a microprocessor, microcontroller, or other analog or digital machine or circuit. The processing means processes the received signals representative of the density of the output mixture to control actuation of the valve control means to selectively obstruct the first and second inlets of the proportioning valve. In this manner, the closed loop control system, comprising the density measurement means, processor and valve control means, controls the proportioning valve to produce an output mixture having the desired proportion of the first fluid or gas to the second fluid or gas.

Other features and advantages of the present invention will be appreciated by those skilled in the art by reading the detailed description which follows with reference to the attached drawings.

DETAILED DESCRIPTION OF THE INVENTION

Figure 1:
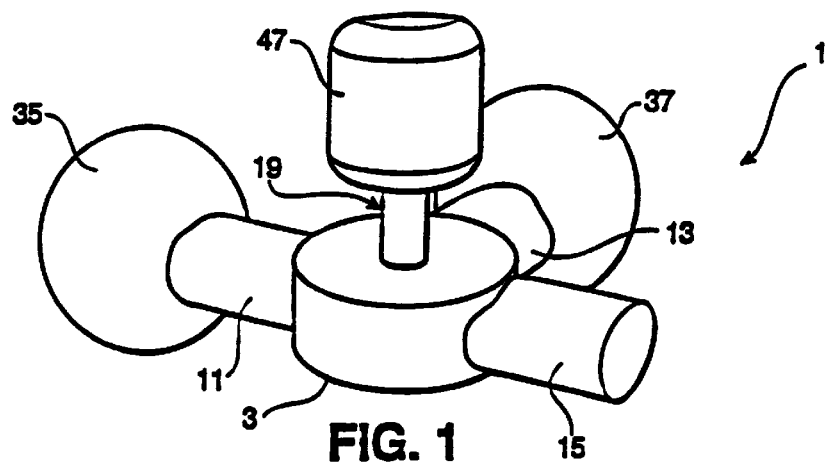
FIG. 1 is a schematic view of the proportioning valve of the present invention.

While the present invention is susceptible of embodiment in various forms, there is shown in the drawings and will hereinafter be described a presently preferred embodiment of the invention, with the understading that the present disclosure is to be considered as an exemplification of the invention and is not intended to limit the invention to the specific embodiment illustrated.

As shown in the drawings where like numeral represent like elements, the invention is embodied in a proportioning valve apparatus and control system for accurately and precisely mixing gases or fluids.

Figure 2:
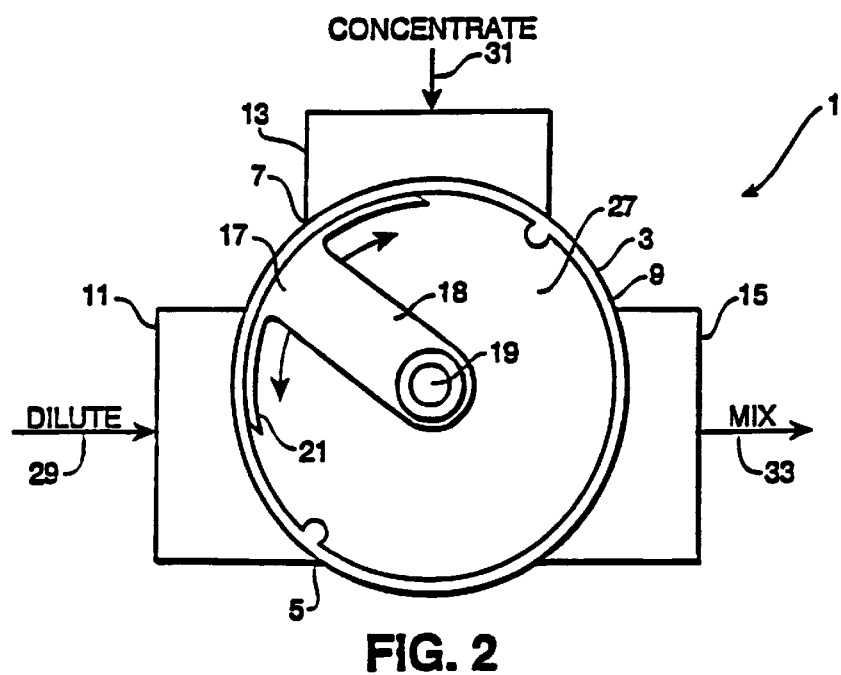
FIG. 2 is a sectional view of the proportioning valve showing the valve chamber and rotary plug of the present invention.

Referring to FIGS. 1 and 2, in a preferred embodiment the proportioning valve apparatus 1 includes a substantially cylindrical valve body 3 formed with an integral valve chamber 27. The proportioning valve apparatus further includes first and second inlets, 5 and 7, respectively, for receiving selected gases or liquids into the valve chamber. In a preferred embodiment, each of the respective inlets include a check valve (not shown) allowing one way flow of the selected gases or liquids into the valve chamber. The apparatus of the present invention further includes storage reservoirs 35 and 37 which provide a source for the selected fluids or gases which are mixed in the valve chamber 27. The selected fluids or gases are directed from the storage reservoirs into the first and second inlets of the proportioning valve by means of first and second input conduits 11 and 13, respectively. The proportioning valve further includes an outlet port 9 for expelling the mixture of gases or liquids from the valve chamber.

The cylindrical valve body 3 includes an axially extending concentric bore. A rotary shaft 19 telescopes through the bore and into the valve chamber 27. Coupled to the extremity of the rotary shaft and disposed in the valve chamber is a rotary plug 17. The rotary plug 17 is formed with a barrier element 21 and a support arm 18 tangentially affixed to the rotary shaft. The support arm 18 extends tangentially from the rotary shaft across the interior of the valve chamber to engage the rotary barrier element 21. The rotary barrier element is configured to selectively block the first and second inlets such that as the rotary plug is rotated in a first direction by means of the rotary shaft, the barrier element 21 uncovers the first inlet 5 while simnultaneously closing the second inlet 7. Thus, as the rotary plug 17 is rotated in the first direction, there is an increase in fluid or gas directed through the first inlet, while fluid or gas directed through the second inlet is decreased. Similarly, when the rotary plug 17 is rotated in a second direction by the rotary shaft 19, the first inlet is closed while the second inlet is simultaeously opened. In this manner, rotation of the rotary plug 17 in the second direction operates to decrease flow of a fluid or gas passing through the first inlet while increasing the passage of fluid or gases through the second inlet into the valve chamber 27.

Figure 3:
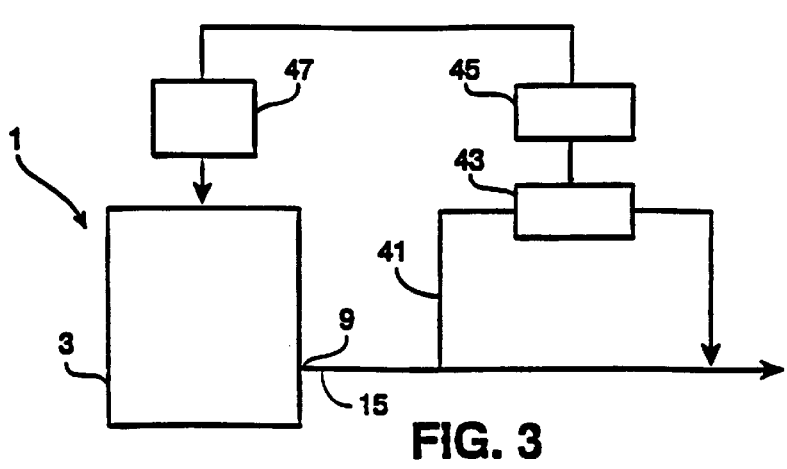
FIG. 3 is a block diagram showing the closed loop control system for the proportioning valve of the present invention.

With reference also to FIG. 3, the proportioning valve of the present invention further includes a valve control means 47. The valve control means is typically in the form of a servo motor, solenoid motor, stepper motor or any other manner of similar control means well understood by those in the art. The valve control means 47 engages the extremity of the rotary shaft 19 disposed exterior of the valve chamber 27. Activation of the valve control means effects rotation of the rotary shaft and, accordingly, rotation of the rotary plug. In this manner, the control means selectively controls rotation of the rotary plug such that rotation of the rotary plug in a first direction operates to obstruct the first inlet 5 while simultaneously opening the second inlet 7. Similarly, activation of the control means to rotate the rotary shaft and rotary plug in a second direction operates to open the first inlet while simultaneously obstructing the second inlet. Accordingly, the proportioning valve apparatus of the present invention provides an efficient and effective mixing valve for providing an output mixture of an accurate proportion of a first gas or liquid with a second gas or liquid.

Referring to FIG. 3, the present invention further includes a control system for providing accurate and precise control of the proportioning valve apparatus to dispense an output mixture of a desired proportion of the first fluid or gas to the second fluid or gas. The control means includes a closed loop control system including a density measurement means 43, a signal processor 45 and a valve control means 47 coupled to the rotary shaft 19. The outlet 9 is connected to an output conduit 15 for expelling the desired mixture. Affixed to the output conduit is a side stream 41 which continuously receives a small test sample of the output mixture and thereafter return the test sample back to conduit 15. The sidestream 41 is coupled to the density measurement means 43 which measures the density of the output mixture. The density measurement means continuously or periodically measures the density of the output mixture and from these measurements produces signals representative of the density of the output mixture. Connecting the density meter to the valve control means is a signal processor 45. The signal processor, which may be microprocessor, microcontroller, or other type of analog or digital machine or circuit well known to those in the art, receives signals produced from the density meter representative of the density of the output mixture and in response provides commands to the valve control means to selectively rotate the rotary shaft to provide for a desired output mixture.

In operation, the output mixture of either a gas or liquid flows from the valve chamber 27 through outlet 9 and outlet conduit 15. The output mixture is then partially diverted into side stream 41. The density meter 43 measures the density of the output mixture and produces a signal representative of the density thereof which is sent to processor 45. Processor 45 is programmed to include a range of the desired density of the output mixture. If the density meter transmits a signal to the processor indicating that the output mixture includes a low proportion of the first input gas or liquid in relation to the second input gas or liquid, the processor 45 transmits a signal to valve controller 47 operative to rotate rotary shaft 19 and rotary plug 17 in a first direction to open first inlet 5 while simultaneously closing second inlet 7. Similarly, if the processor 45 receives a signal from the density meter indicating that there is a high proportion of the first input gas or liquid in relation to the second input gas or liquid, then the processor transmits a signal to valve controller 47 operative to rotate the rotary shaft and rotary plug such that the first inlet is closed while the second inlet is simultaneously opened. Finally, where the density meter transmits a signal to the processor indicating that the output mixture is within the desired range, the processor maintains the rotary shaft and rotary plug in a fixed position.

As would be understood by those in the art, the proportioning valve apparatus and closed loop control system including a density measurement means has widespread application. It has been found that the present invention is particularly useful for the production of liquid mixtures which are useful in fighting forest fires. These liquid mixtures, which are often dropped out of an airplane and onto a forest fire, comprise a liquid concentrate and a dilute of water. The concentrate must be diluted with water in varying rates from 4.5:1 to 10:1 part per water per part of concentrate. It has been found that by introducing the concentrate into the first inlet and by introducing the water into the second inlet, these two liquids can be mixed in the valve chamber to produce an effluent having the desired proportion of the concentrate to the water.

Although the present invention has been described with reference to a preferred embodiment, workers skilled in the art will recognize that changes may be made in form and detail without departing from the spirit and scope of the invention. Having identified the presently preferred best mode thereof.

I claim:

1. A closed loop control system for controlling the mixture of a first liquid with a second liquid to produce a liquidous mixture having a desired proportion of the first liquid to the second liquid, the closed loop control system comprising:

a) a first supply means for supplying a first liquid:

b) a second supply means for supplying a second liquid;

c) a proportioning valve mean having a valve body, a first inlet for receiving said first liquid, a second inlet for receiving said second liquid and an outlet for expelling an output now of a third liquid comprised of a mixture of said first liquid and said second liquid, said proportioning valve apparatus further including;

i) a valve body having a first inlet, a second inlet and an outlet;

ii) a rotary shaft ratably held by said valve body; and iii) a rotary valve barrier disposed in said housing and affixed to said rotary shaft, said rotary valve barrier configured to selectively close said first and second inlets, rotation of said rotary valve barrier in a first direction being operative to close said first inlet while simultaneously opening said second inlet, rotation of said rotary valve barrier in a second direction being operative to open said first inlet while simultaneously closing said second inlet;

d) a first conduit for communicating said liquid between said first supply means and said first inlet;

e) a second conduit for communicating said second liquid between said second supply means and said second inlet;

f) a valve control means for controlling the rate of flow of said first liquid through said first inlet and for controlling the rate of flow of said second liquid through said second inlet;

g) a density measurement means for measuring the density of said liquidous output flow;

h) a signal means coupled to said density measurement means for producing signals representative of the density of said output flow; and i) a processing means coupled with said signal means and said valve control means for receiving said signals and responsive thereto for controlling the rate of flow of said first liquid through said first inlet and for controlling the rate of flow of said second liquid through said second inlet to produce said output mixture having a desired proportion or said first liquid to said second liquid.

* * * * *